2,834,812

PROMOTED CARBONYLATION REACTION

Vincent L. Hughes, Clark Township, and Isidor Kirshenbaum, Union, N. J., assignors to Esso Research and Engineering Company, a corporation of Delaware No Drawing. Application April 9, 1956
Serial No. 576,768

5 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, the present invention relates to carrying out the above reaction in the presence of certain amide components for the purpose of promoting the reaction.

It is now well known in the art that oxygenated organic compounds may be synthesized from organic compounds containing olefinic linkages by a reaction with carbon monoxide and hydrogen in the presence of a catalyst containing a metal in group VIII of the periodic chart, particularly cobalt, in an essentially three-stage process. In the first stage, the olefinic material, catalyst and the proper proportions of carbon monoxide and hydrogen are reacted to give a product consisting predominantly of aldehydes containing one more carbon atom than the reacted olefin. This organic mixture which contains dissolved therein, salts and the carbonyls and molecular complexes of the metal catalyst, is treated in the second stage to cause removal of soluble metal compounds from the organic material in a catalyst removal zone. The catalyst-free material may then be hydrogenated to the corresponding alcohols or may be oxidized to the corresponding acid or may be reacted with ammonia to form amines, etc.

This carbonylation reaction provides a particularly attractive method for preparing valuable aldehydes and primary alcohols or derivatives thereof which find large markets particularly as intermediates for such products as plasticizers, detergents, solvents and the like. Amenable to the reaction are long and short chained olefinic compounds, the choice depending upon the type alcohol and/or aldehyde product desired. Not only olefins but most olefinic compounds possessing at least one non-aromatic-carbon double bond may be reacted by this method. Thus, straight and branch chained olefins and diolefins such as propylene, butylene, pentene, hexene, heptene, butadiene, pentadiene, styrene, olefin polymers, such as di- and tri-isobutylene and hexene and heptene dimers, polypropylene, polyethylene, olefinic fractions from the hydrocarbon synthesis process, thermal or catalytic cracking operations and other sources of hydrocarbon fractions containing olefins may be used as a starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, particularly suitable catalysts are, for example, cobalt oleate or naphthenate. These salts are soluble in a liquid olefin feed and may be supplied to the first stage as hydrocarbon solution in an inert solvent such as n-hexene dissolved directly in the olefin feed, or dissolved in aldehyde or alcohol.

It has been recognized that various forms of cobalt catalyze this reaction; however, the active catalytic agent is believed to be one or more of the cobalt-carbonyl compounds. These compounds may be added as such or formed in situ from the cobalt compound or metal originally introduced.

Other forms of catalyst have been used such as aqueous solutions of water soluble cobalt salts, i. e., cobalt acetate. Here the reaction rates in the presence of aqueous catalyst solutions are slower than those in the presence of oil-soluble cobalt salts. Furthermore, in order to add an amount of cobalt acetate or the like equivalent to cobalt oleate to provide the desired cobalt concentration of about 0.3 weight percent based on olefin feed, about 5–6 volume percent of water based on olefin must be added. Such a system has been found not to function efficiently and tends to result in a less favorable feed rate vs. olefin conversion relationship than cobalt oleate catalyst at equivalent cobalt concentration. It is readily seen, therefore, that it would be extremely desirable to promote the oxo reaction to effect substantially increased reaction rates. Preformed cobalt carbonyl may be especially desirable as the oxo catalyst since this form of catalyst is the most active known. With preformed cobalt carbonyl the induction period is reduced to a minimum.

The synthesis gas mixture feed to the first stage may consist of a ratio of $H_2$ to CO in the range of 1/10 to 10/1, but preferably these gases are present in the ratio of 1/1 to 5/1. The conditions for reacting olefins with $H_2$ and CO vary somewhat in accordance with the nature of the olefin feed and are somewhat dependent upon the desired products, but the reaction is generally conducted at pressures in the range of about 300 to 10,000 p. s. i. g., preferably 2,000 to 6,000 p. s. i. g. and at temperatures in the range of about 60°–150° C., preferably 70–95° C. The effect of temperature on the reaction rate is marked. For example, at 150° C. the oxo reaction is fairly rapid, however, decreasing the temperature correspondingly decreases the reaction rate resulting in a substantial increase of operating cost due to the longer residence time required for conversion of olefin to oxygenated products. The ratio of synthesis gas to olefin feed may vary widely but in general about 2,500 to 15,000 cubic feed of $H_2+CO$ per barrel of olefin feed are employed.

At the end of the first stage, when the desired conversion of olefins to oxygenated compounds, particularly, aldehydes, has been effected, the product and unreacted material are generally withdrawn to a catalyst removal zone where dissolved catalyst is removed from the mixture by one of several procedures. Thermal treatment in the presence of an inert gas, vapor, water, or anhydrous or aqueous acid may be used. Thereafter, the aldehydic reaction product may be hydrogenated to the corresponding alcohol.

Difficulties also arise from the increased residence times in that there is a decreased selectivity to the aldehyde when this product is the desired one. Another problem encountered when conventional carbonylation catalysts are employed is that high catalyst concentrations are needed to somewhat off-set the lower operating temperatures when it is necessary or desirable to operate at reasonably fast rates of reaction.

It is an object of the present invention to set forth a process of preparing aldehydes and alcohols from olefins employing a conventional carbonylation catalyst and an amide type promoter therefor, which will provide a reaction rate of a higher order of magnitude than that found in the normal operating process.

It is a further object of the present invention to employ cheap and readily available amide type compounds in the oxo reaction to promote the carbonylation reaction, thereby realizing greatly increased reaction rates.

It has now been found that certain amide type compounds having the general formula:

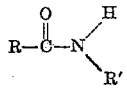

are very effective for promoting the carbonylation reaction. R and R′ may be hydrogen or any hydrocarbon radical such as alkyl, aryl, alkaryl, aryl alkyl, phenyl and the like. R and R′ may be the same or different, however, it has been found that the lower molecular weight amides are more effective than the higher molecular weight compounds. It is accordingly preferred to employ an amide coming within the above formula wherein R and R′ each represent alkyl radicals having less than four carbon atoms, e. g., methyl, ethyl and propyl. Representing the less effective radicals are butyl, heptyl, octyl, phenyl, methyl phenyl and the like. Illustrative amides which may be used are formamide, acetamide, n-methyl formamide, n-ethyl formamide, n-methyl acetamide, n-propyl acetamide, n-methyl propionamide, n-propyl propionamide and acetanilide. Higher molecular weight amides coming within the formula recited above are now apparent from the few illustrative examples given above. Formamide especially is extremely effective when used in conjunction with conventional carbonylation catalysts to effect the desired high reaction rates. Another effective promoter is acetamide.

The preferred range for the amide promoter is from 0.05 to 0.7 mole/mole of catalyst, however, up to 2 moles of promoter per mole of catalyst may be used. Generally, the amide accelerator is more effective over range of about 10 to 40% by weight based on the cobalt or other catalyst metal employed.

The catalyst promoter may be added in any convenient manner either with the oxo catalyst as a slurry in the cobalt oleate solution or separately, as for example in the olefin feed or recycle stream. The manner in which the catalyst and promoter are added is not regarded as critical, and a solution or slurry thereof may be injected into the oxo reactor by any conventional method of adding feed or catalyst to a system under pressure. Such methods include the use of slurry pumps, injectors, surge systems, etc. The process of the present invention may be further illustrated by the following specific examples. An essential feature of this invention requires the reaction to be carried out in the presence of the amide promoter.

Butene-1 was oxonated with and without a formamide promoter and the comparative data are given below:

TABLE I

*Oxonation of Butene-1*

CO/H₂: 1/1
Catalyst: Cobalt oleate
Pressure: 3,500 p. s. i. g. (initial)

| Run No. | Temp., °C. | Cat. Conc. Percent Co on Feed | Percent Formamide on Feed | Relative Rate |
|---|---|---|---|---|
| 1 | 140 | 0.08 | 0.00 | 1 (Control) |
| 2 | 140 | 0.08 | 0.04 | 5 |
| 3 | 105 | 0.4 | 0.00 | 1 (Control) |
| 4 | 105 | 0.4 | 0.08 | 2.4 |

The above data show the marked increase in relative reaction rate experienced when adding minor amounts of formamide to the reaction zone.

The following table illustrates the use of lower catalyst concentrations while maintaining the same reaction rate:

TABLE II

*Oxonation of Butene-1*

Temperature: 105° C.
Pressure: 3,500 p. s. i. g.
H₂/CO: 1/1
Catalyst: Cobalt oleate

| Percent Formamide on Feed | Percent Co on Feed | Reaction Rate Constant [1] |
|---|---|---|
| 0.08 | 0.4 | $1.9 \times 10^{-2}$ |
| 0.00 | 1.2 | $1.9 \times 10^{-3}$ |

[1] Calculated, from observed rate data, on the basis of a first order reaction.

The above data indicate that decreased amounts of catalyst, i. e., one-third the amount, may be used while maintaining the same fast reaction rate by the addition of an amide promoter.

In the past there has been an attempt to accelerate the oxo reaction by the addition of various compounds; however, to a large extent, these prior art additives have been found to be substantially ineffective and in some cases, have actually inhibited the reaction.

The following table is a comparative study of relative reaction rates of the carbonylation process using various promoters:

TABLE III

Olefin feed: Butene-1
Temperature: 140° C.
Pressure: 3,500 p. s. i. g. (initial)
H₂/CO: 1/1
Cobalt oleate 0.08% by weight on feed

| Promoter | Wt. Percent on Feed | Relative Rate |
|---|---|---|
| None | 0.00 | 1 |
| Formamide | 0.04 | 5 |
| Pyridine | 0.13 | 1.3 |
| Trimethyl Amine | 0.04 | 0.3 |
| Thiophene | 0.33 | 1.1 |
| Aniline | 0.07 | 0.9 |

It is readily seen that formamide is significantly superior to other additives, being about at least ten times as effective as the best of these additives, on a weight basis. Moreover, some of the promoters tend to add objectionable impurities, such as sulfur.

A comparison of formamide and acetamide with other amides is shown in the following Table IV:

TABLE IV

Olefin feed: Butene-1
Temperature: 100° C.
Pressure: 3,500 p. s. i. g.
H₂/CO mole ratio: 1/1
Cobalt—0.4 wt. percent Co/olefin as preformed carbonyl

| Promoter | Wt. Percent on Feed | Relative Rate |
|---|---|---|
| None | | 1 |
| Formamide | 0.08 | 2.4 |
| Acetamide | 0.08 | 1.4 |
| Dimethyl Formamide | 0.08 | 0.8 |

The following table illustrates the effect of formamide concentration with respect to the catalyst on the relative reaction rate:

TABLE V $H_2/CO$: 1/1
Pressure: 3,500 p. s. i. g.
Catalyst: Cobalt oleate, 0.4% cobalt/olefin

| Formamide Concentration | | Relative Rate |
|---|---|---|
| Percent on Co | Percent on Feed | |
| 0 | 0 | 1.0 |
| 10 | 0.04 | 1.8 |
| 15 | 0.06 | 2.1 |
| 20 | 0.08 | 2.4 |
| 30 | 0.12 | 2.8 |
| 40 | 0.16 | 2.5 |
| 60 | 0.24 | 1.5 |
| 80 | 0.32 | 1.15 |

These data indicate that when a primary amide, particularly formamide, is employed as an accelerator over a concentration range of about 10–40 wt. percent based on cobalt, the reaction rate is increased markedly. Both above and below this concentration range, the activating effect of formamide is somewhat less pronounced. For example, at high promoter concentrations, e. g. over 40%, there is a decided drop in the relative reaction rate.

It has now been found that in conjunction with the use of an amide, e. g. formamide, as an accelerator or promoter for the oxo reaction, the partial pressure of hydrogen can be increased and the need minimized for higher catalyst concentration to further increase the reaction rate at low temperatures. The table below summarizes the effect of increased hydrogen pressure and formamide concentration in the oxo reaction at low temperatures.

TABLE VI

Olefin feed: Butene-1
Batch reaction in stainless steel reactor

| Catalyst Conc. (Wt. Percent on Feed) | | | Pressure, p. s. i. g. | | Relative Rate |
|---|---|---|---|---|---|
| Temp., °C. | Cobalt | Formamide | $H_2$ | CO | |
| 90 | 0.2 | 0.0 | 1,750 | 1,750 | 1.0 (Control). |
| 90 | 0.5 | 0.16 | 1,750 | 1,750 | 7.0. |
| 90 | 0.2 | 0.08 | 3,500 | 1,750 | 5.0. |

Several important advantages of the process of the present invention are evident from the above. Considerable savings with respect to the cobalt catalyst may be achieved. High catalyst concentration is moreover accompanied by increased bottoms production. The economically lower temperatures and pressures may be made to replace the presently employed conditions. Greater selectivity and choice of the desired final product may be had by the use of the additives of this invention. Since the amount of additive is relatively small with respect to the olefin feed, it does not present any difficulties with respect to recovery or pollution, etc.

It is to be understood that the present process is amendable to batch type, semi-continuous, and continuous operations, all of which are well known in the art.

What is claimed is:

1. In a carbonylation reaction wherein an olefinic compound is reacted with carbon monoxide and hydrogen at elevated temperatures and pressures in the presence of a metal-containing carbonylation catalyst to produce an aldehyde containing one more carbon atom in the molecule than said olefinic compound, the improvement which comprises employing an amide having the following structural formula:

wherein R and R' each represent a radical selected from the group consisting of hydrogen and a lower alkyl radical as a promoter for said reaction.

2. A process in accordance with claim 1 wherein said amide is present in amount of from 10 to 40 wt. percent based on the catalyst metal.

3. A method of preparing aldehydes which comprises reacting an olefinic compound with carbon monoxide and hydrogen at elevated temperatures and pressures in the presence of a cobalt-containing carbonylation catalyst promoted by not more than 40 wt. percent based on the cobalt of an amide having the following structural formula:

wherein R and R' each represent a radical selected from the group consisting of hydrogen and a lower alkyl radical.

4. A method of preparing an aldehyde product from an olefin wherein said aldehyde contains one more carbon atom in the molecule than said olefin which comprises reacting an olefin with carbon monoxide and hydrogen at elevated temperatures and pressures in the presence of a cobalt-containing carbonylation catalyst and from 10 to 40 wt. percent based on the cobalt of formamide as a promoter therefor.

5. In a carbonylation reaction wherein an olefinic compound is reacted with carbon monoxide and hydrogen at elevated temperatures and pressures in the presence of a metal-containing carbonylation catalyst to produce an aldehyde containing one more carbon atom in the molecule than said olefinic compound, the improvement which comprises employing formamide as a promoter for said reaction.

References Cited in the file of this patent

UNITED STATES PATENTS

| 2,437,600 | Gresham et al. | Mar. 9, 1948 |
| 2,564,104 | Gresham et al. | Aug. 14, 1951 |
| 2,587,858 | Keulemans | Mar. 4, 1952 |
| 2,644,844 | Brooks et al. | July 7, 1953 |